United States Patent
Chevalier et al.

[11] Patent Number: 5,881,050
[45] Date of Patent: Mar. 9, 1999

[54] METHOD AND SYSTEM FOR NON-DISRUPTIVELY ASSIGNING LINK BANDWIDTH TO A USER IN A HIGH SPEED DIGITAL NETWORK

[75] Inventors: Denis Chevalier, La Colle sur Loup; Olivier Bertin, Nice; Claude Galand, Cagnes sur mer; Yves Ouvry, St. Laurent du Var, all of France; Marcel Villaflor, White Plains, N.Y.

[73] Assignee: International Business Machines Corporation, Armonk, N.Y.

[21] Appl. No.: 785,944

[22] Filed: Jan. 22, 1997

[30] Foreign Application Priority Data

Jul. 23, 1996 [EP] European Pat. Off. ............... 96480091

[51] Int. Cl.[6] ..................................... H04L 12/44
[52] U.S. Cl. ........................... 370/230; 370/254; 370/444
[58] Field of Search ................................ 370/230, 232, 370/233, 234, 465, 468, 431, 444, 437, 443, 254, 400

[56] References Cited

U.S. PATENT DOCUMENTS 5,687,167  11/1997  Bertin et al. ............................ 370/444
5,699,355  12/1997  Natarajan ................................ 370/443

*Primary Examiner*—Chau Nguyen
*Assistant Examiner*—Phuongchau Ba Nguyen
*Attorney, Agent, or Firm*—Josceylyn G. Cockburn

[57] ABSTRACT

A method based on predefined connection priorities for assigning link bandwidth to a requesting user in a high speed digital network interconnecting network users through a path including network nodes connected through high speed links. According to this method, a predefined reservable link bandwidth is split into so-called nominal bandwidth portions and common bandwidth portions, both assignable to the same connections on a priority basis. Each of the common bandwidth priorities is individually related to a nominal bandwidth priority through a predefined relationship, making the common bandwidth priorities always lower than any nominal priority. In this way the requested link connection bandwidth, whatever be its nominal priority, is made preemptable primarily on all common bandwidth, thus avoiding the disruption of any network connection which is already established.

9 Claims, 10 Drawing Sheets

METHOD AND SYSTEM FOR NON-DISRUPTIVELY ASSIGNING LINK BANDWIDTH TO A USER IN A HIGH SPEED DIGITAL NETWORK

FIELD OF THE INVENTION

The present invention deals with a method and system for assigning link bandwidth to a user in a high speed digital network, for establishing a new connection and/or dynamically adjusting the bandwidth of an already established connection with improved fairness, i.e., without disrupting any already established connection. More particularly, the non-disruptive feature of already established connections shall apply whatever be the preemption priority of said established connections with respect to a bandwidth demanding connection. This method increases the fairness in bandwidth assignment to connections.

BACKGROUND OF THE INVENTION

The data transmission is now evolving with a specific focus on applications by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non deterministic and requires more connectivity. Based on the above, there is strong requirement for supporting distributed computing applications across high speed networks that can carry local area network communications, voice, video, and traffic among channel attached hosts, business, engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

The key requirement of these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection are managed by the access points of the network which reduces both the awareness and the function of the intermediate nodes. However, each network node stores an image of the network in a so-called topology database enabling any intermediate network node to perform a number of network control functions.

But, inevitably, for cost reasons, communication networks have at their disposal limited resources to ensure efficient packet transmission. These limitations are principally located at the level of links bandwidth, nodes processing capacity and buffer sizes at the emission and reception of data packets. When traffic demand increases, the network undergoes congestion phenomena which take the form of a collapse of the network performances expressed in terms of actual throughput, average transfer delay of packets through the network, number of packets lost or in error, etc..

An ideal network should be able to transmit useful traffic directly proportional to the traffic offered to the network, up to maximum capacity. Beyond this limit, the network should operate at its maximum capacity whatever the demand is. In reality, the operations diverge from the ideal for reasons related to the inefficient allocation of resources in overloaded environment. In particular, the size of the queues on the links increases rapidly in function of the traffic and exceeds the capacity of the buffers in the nodes. Packets which cannot be stored anymore are thrown away, requiring retransmission and propagating congestion towards links located upstream generating an additional internal traffic. There is an avalanche phenomenon due to the fact that beyond a certain limit, the useful transport capacity of the network decreases when the demand for traffic increases.

For the operating to be satisfactory, the network must be implemented so as to avoid congestion. The simplest solution obviously consists in oversizing the equipments so as to be positioned in a operating zone which is distant from the congestion. This solution is generally not adopted for evident reasons of cost and it is necessary to apply a certain number of preventive measures of which the main ones are:

flow control for regulating the emitting data rate of the calling subscriber at a rate compatible with what the receiver can absorb.

load regulation for globally limiting the number of packets present in the network to avoid overloading the resources, and, load balancing for fairly distributing the traffic over all the links of the network to avoid local congestion in particular resources.

All this requires some discipline in communication bandwidth management Bandwidth management in most high speed packet communications networks utilizes connection level controls applied at the time the connection is set up based on the load characteristics of the transmission links in the connection route at the time that the connection is set up. Such connection level controls include bandwidth allocation, path selection, admission control and call set up. Bandwidth allocation is accomplished by noting, at the connection set up time, the "equivalent capacity" loading that the new connection will generate, based on the traffic characteristics of the source signal and the desired quality of service. Using this equivalent capacity, Ceq, as the bandwidth that must be available to carry the new connection, the originating node port of the network computes a path to the destination node that is capable of carrying the new connection and providing the level of service required by the new connection. This path selection process utilizes data describing the current state of the traffic in the entire network. Such data are stored in a topology database located at each node of the network. If no suitable path can be found to meet these requirements, the connection is rejected. Once a suitable path has been selected at the entry node, a set up message is generated which traverses the selected route, updating the resource allocations for each link visited by the set up message.

More particularly, each node topology data base includes a table of the network nodes and a table of the network links, the latter including one table per link which includes information relative to the current link properties, current link state and reserved bandwidth. This information is, during operation of the network, regularly updated from network management services.

In order to successfully manage the traffic and to efficiently accommodate connections for data streams with widely different characteristics (voice, video or pure data including batch processable data), it is important at call set-up to reserve a bandwidth for each connection, based on the knowledge of the source characteristics and the network status (i.e. current available bandwidths over the network links and nodes). So-called relative connection priorities (e.g. preemption priorities) have been defined to that end.

Modern network architectures have introduced a large range of connection priorities to cope with the various properties of the source: quality of service, maximum error or loss probability, . . . Connection priorities specify the relative importance of connections in the network, that means the order in which connections can be eventually released or submitted to a degradation of their quality of service for so-called preemptive purposes. More particularly, connection priorities are used by the path selection process to determine the feasibility of a potential route for a new connection. Some existing connections have been made "breakable" to allow the new connection to be established on the link if this one has a higher priority. This solution has also been used for assigning additional bandwidth, on a dynamic basis, in order to "ease" traffic of higher priority order of already established connections requiring more bandwidth, possibly in a burst mode, than already assigned.

In operation, the preempted connections are rerouted throughout the network, whenever possible. But in situations of high traffic, the preempted connection might simply be dropped.

One may easily imagine the drawbacks of both these solutions. The first one, by increasing the required network control traffic with all correlative incidences on required computing power, buffering capacity and bandwidth required for control traffic. The second one by lacking fairness in that it requires breaking already established connections.

It should be noted that the connection priority is not related to the order in which the data packets are transmitted in the network. The problem of the transmission of urgent packets, is handled by a specific packet scheduling process. The delay priority determines for each type of traffic (for example, real time versus non-real time traffic), what service a packet will receive at each intermediate hop of its path from the origin to the destination node. The same delay priority is assigned to every packet that flows in the same network connection.

The individual connection priorities are preassigned to a user on a predefined contractual basis and at different prices.

OBJECTS OF THE INVENTION

One object of this invention is to provide a method for establishing a new connection between two end users of a high speed digital network by preempting bandwidth already assigned to established connections while avoiding network collapse due to the need of rerouting any preempted established connection.

Another object of this invention is to provide a method for establishing a new connection between two end users of a high speed digital network by assigning bandwidth to said connection without disrupting any already established connection, whatever be the priority of the new connection relative to the already established connections.

A further object of this invention is to provide a method for varying the bandwidth of an already established connection between two end users of a high speed digital network without disrupting any already established network connection whatever be the considered connection priority relative to the other established connections priorities.

Still another object of this invention is to provide a system for implementing the invention method by defining a potential path for a demanding user and updating it by the status of connections in any high speed network node.

These and other objects, characteristics and advantages of this invention will become more apparent from the following detailed description of a preferred embodiment of the invention when considered with reference to the accompanying figures.

SUMMARY OF THE INVENTION

The above mentioned objects are achieved by a method based on predefined connection priorities for assigning link bandwidth to a requesting user in a high speed digital network interconnecting network users through paths including high speed links interconnecting network nodes, said method being characterized in that the predefined assignable link bandwidth is split into so-called nominal bandwidth and so-called common bandwidth. Both are assignable to same connections on a priority basis with each said common bandwidth priorities being individually related to a nominal bandwidth priority through a predefined relationship making said common bandwidth priorities always lower than any nominal priority, whereby said requested link connection bandwidth, whatever its nominal priority, is made preemptable primarily on all common bandwidth, thus avoiding the disruption of any already established network connection.

The present invention improves fairness in network connection bandwidth assignment at both the connection set-up level and by varying bandwidth dynamically assigned to already established connections without breaking established connections of lower connecting priority levels.

DESCRIPTION OF A PREFERRED EMBODIMENT OF THE INVENTION

Figure 1:
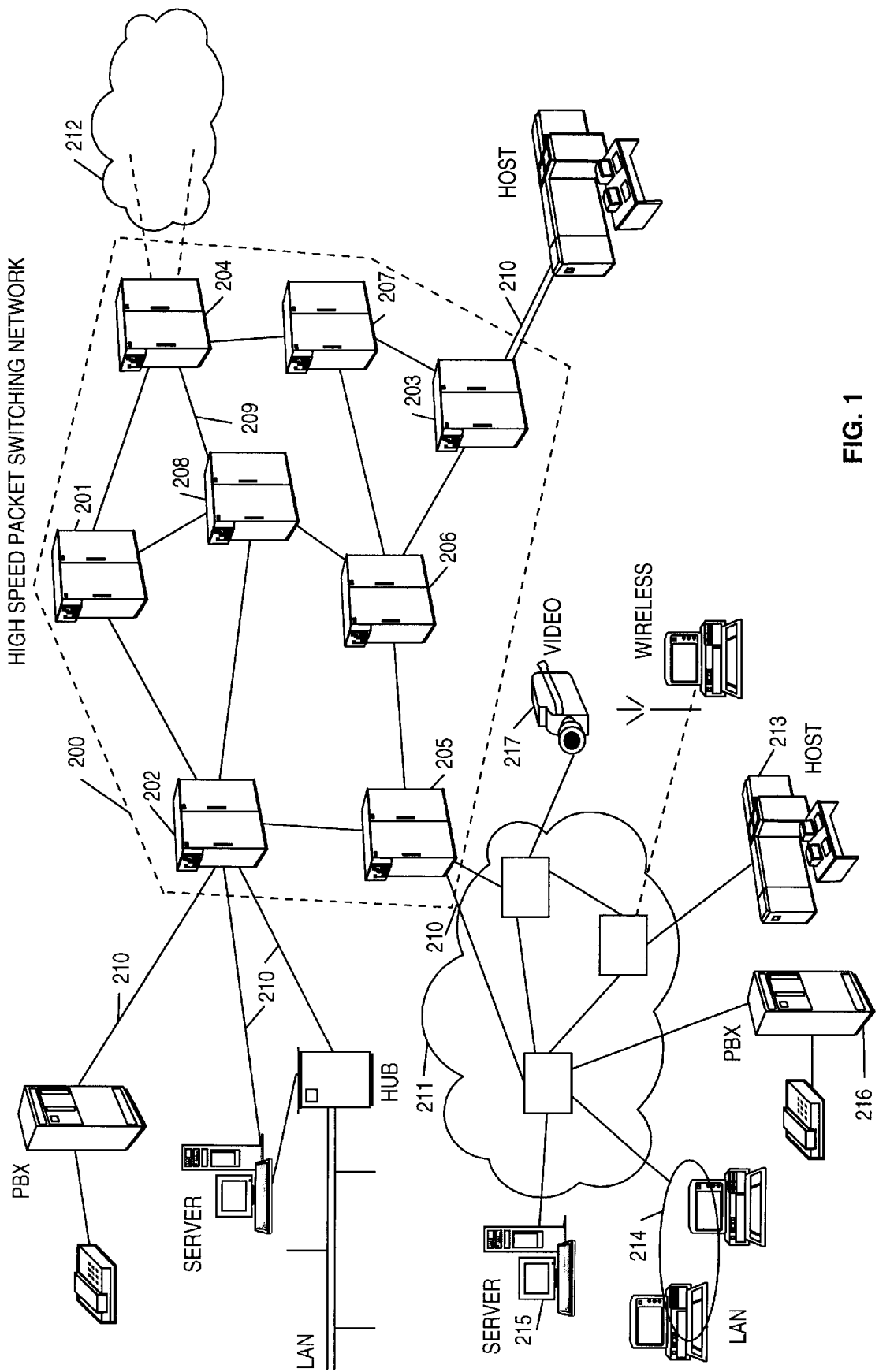
FIG. 1 is a representation of a complex digital network including a high speed packet switching network wherein the invention can be implemented.

As illustrated in FIG. 1 a typical model of communication system is made of several user networks (212) communicating through a high performance network (200) using private lines, carrier provided services, or public data networks. Each user network can be described as a set of communication processors and links (211) interconnecting large computers used as Enterprise Servers (213), user groups using workstations or personnel computers attached on LAN (Local Area Networks 214), applications servers (215), PBX (Private Branch eXchange 216) or video servers (217). These user networks, dispersed in different establishments, need to be interconnected through wide area transport facilities.

Different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets towards their final destination at the highest possible rate. The present invention applies essentially to the latter category and more particularly to the fast packet switching network architecture detailed in the following paragraphs.

The high speed packet switching transmission system comprises eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. For example, the Access Node 202 interfaces respectively a Private Branch eXchange (PBX), an application server and a hub through three Ports and communicates through the network by means of the adjacent Transit Nodes 201, 206, 207 and 208.

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This network layer header is made of Control, Routing and Redundancy Check Fields.

The Control Fields include, among other things, an encoded identification of the protocol to be used in interpreting the Routing Field.

The Routing Fields contain all the information necessary to route the packet through the network (200) to the destination End Node to which it is addressed. These fields can take several formats depending on the routing mode specified The Redundancy Check Fields are used to check for errors. If an error is detected, the packet is discarded.

Figure 2:
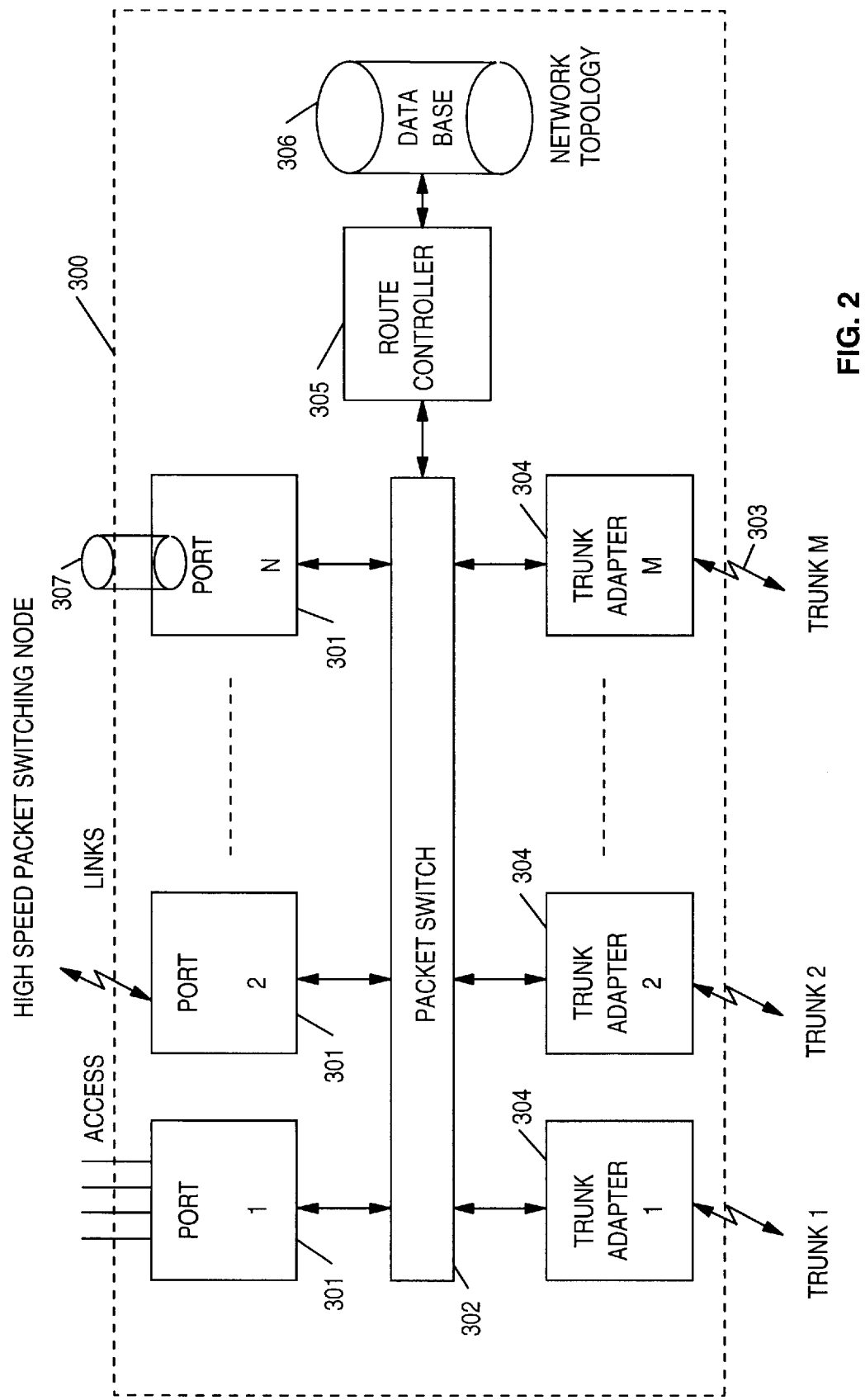
FIG. 2 is a block diagram of a network node.

FIG. 2 shows a general block diagram of a typical Routing Point (300) such as it can be found in the network Nodes (201 to 208) illustrated in FIG. 1. A routing Point comprises a high speed packet Switch (302) onto which packets arriving at the Routing Point are entered for being oriented toward the appropriate node exit. Such packets are received from other nodes over high speed transmission links (303) via Trunk Adapters (304), or from users via application adapters called Ports (301).

Using information in the packet header, the adapters (304, 301) determine which packets are to be routed by means of the Switch (302) towards a local user network (307) or towards a transmission link (303) leaving the Node. The adapters (301 and 304) include queuing circuits for queuing packets prior to or subsequent to their launch on the Switch (302).

A Route Controller (305) performing Trunk Connection Management (TCM) operations calculates the optimum routes through the network (200) so as to minimize the amount of network resources used to complete a communication path and builds the header of the packets generated in the Routing Point. The optimization criteria includes the characteristics of the connection request, the capabilities and the utilization of the Trunks in the path, the number of intermediate nodes.

All the information necessary for the routing, about the nodes and transmission links connected to the nodes, are contained in a Network Topology Database (306). Under steady state conditions, every Routing Point has the same view of the network, but this might not be the case at all instances. The network topology information is updated when new links are activated or new nodes added to the network. Such information is exchanged by means of control messages with all other Route Controllers to provide the necessary up-to-date information needed for route calculation (such database updates are carried on packets very similar to the data packets between end users of the network). The fact that the network topology is kept current in every node through continuous updates allows dynamic network reconfigurations.

The incoming transmission links to the packet Routing Point may comprise links from external devices in the local user networks (210) or links (Trunks) from adjacent network nodes (209) of network 200. In any case, the Routing Point operates in the same manner, to receive each data packet and forward it onto another Routing Point as dictated by the information in the packet header.

The routing within the network presents two aspects:

1. Determining what the route (i.e. path) for a given connection shall be.

2. Actually switching the packet within a switching node after the route has been actually set and acknowledged by all involved network nodes.

There are many methods of determining a route through a network for very high throughput. one of these methods used in the field is the path selection method using the so-called Bellman-Ford algorithm which is executed whenever an end user attached to the entry node providing a port (e.g.; node 202) is to be connected to another end user attached to an exit node (e.g. node 203). The path selection involves scanning all possible links connecting the network nodes to help selecting the best network path between said two end users. Once a path has been selected, the entry node sends a call set up message to each node on said path, down to the exit node. The call set up message is processed in each said individual nodes by a so-called Transit Connection Manager (TCM) which manages the bandwidth of each trunk involved in the selected path. Once the route is selected, the critical item is that the switching elements must be able to route an incoming packet in a very short portion of time. Driven by the requirements to keep transit node processing at a minimum, the transport services are designed to operate on an end-to-end basis so there is no hop-by-hop error recovery or re-transmission envisioned for high speed, high performance (low error) links.

During network operation, data packets are routed and queued in the transit nodes according to the routing information contained in the packet header. Several routing modes can be used in high speed networks. Each routing mode has its particular intended use and includes advantages and disadvantages that complement the other modes.

Network Control Functions are implemented to control, allocate, and manage the resources of the physical network. Each Routing Point has a set of the foregoing functions in the Route Controller (305) and uses it to facilitate the establishment and the maintenance of the connections between users applications. The Network Control Functions include in particular:

Directory Services
  for retrieving and maintaining information about network users and resources.
Bandwidth Management
  for processing the bandwidth reservation and maintenance messages, and
  for monitoring the current reservation levels on links.
Path Selection
  for choosing the best path for each new connection considering the connection requirements and the current link utilization levels.
Control Spanning Tree
  for establishing and maintaining a routing tree among the network nodes,
  for using it to distribute control information (in parallel) including link utilization, and
  for updating nodes and their Topology Database with new network configurations or link/node failures.

The Control Spanning Tree is the principal system used to disseminate control information such as Topology Database (306) updates. This mechanism is fundamental to minimize delays due to intermediate node processing whereby an intermediate node will get each control message exactly once on the tree, and the message can be forwarded along outgoing links of the tree before the intermediate node has even looked at the packet contents.

A distributed algorithm creates and maintains the Control Spanning Tree in presence of node and link failures and helps minimizing the impact of the increased control flows that result when the network grows. Said algorithm performs Topology Updating and Congestion Control operations. Topology updating distributes and maintains, in every node, information about the physical and logical network (including link utilization information and link bandwidth reservation information ) using the Control Spanning Tree.

Congestion Control enforces the bandwidth reservation agreements between the network's user and the network which are established at the call set up time, and estimates actual bandwidth, and adjusts reservation if necessary during the life of the connection.

An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable effort has gone into designing congestion control, estimation, and path selection algorithms contributing to manage the network bandwidth.

The simplest way to provide low-or-no packet loss would be to reserve the entire bandwidth of the user connection. For bursty user traffic however, this approach can waste a significant amount of bandwidth across the network. The basic idea is to reserve a bandwidth amount equal to the "equivalent capacity" needed by the user, said equivalent capacity being a function of the source characteristics and of the required quality of service. The reservation level falls somewhere between the average bandwidth required by the user and the maximum capacity of the connection.

Most of the high speed connections are established on a reserved path to guarantee the quality of service and the bandwidth requested by the user. This path across the network is computed by the originating node using information in its Topology Database including current link utilizations. The originating node then sends a reservation request along the chosen path, and intermediate nodes (if allowing the reservation) then add this additionally reserved capacity to their total. These changes are reflected in topology broadcast updates sent by the intermediate nodes.

Depending on the node type, the function of the Bandwidth Management is:
  in the origin node,
    to identify the best possible route according to the network status and the connection parameters including the connection priority, and the requested bandwidth,
  in a transit node,
    to administer the bandwidth reservations on the links.

The Topology Database contains information about nodes, links, their properties, and bandwidth allocation. The topology information is replicated in each node of the network. A topology algorithm guarantees the correctness of each node's Topology Database as links and nodes are added, deleted, or change their characteristics. The database contains, in addition to information like the physical topology of the network, dynamic information representing the amount of bandwidth that is reserved on every link and which is used in the call admission process.

Figure 3:
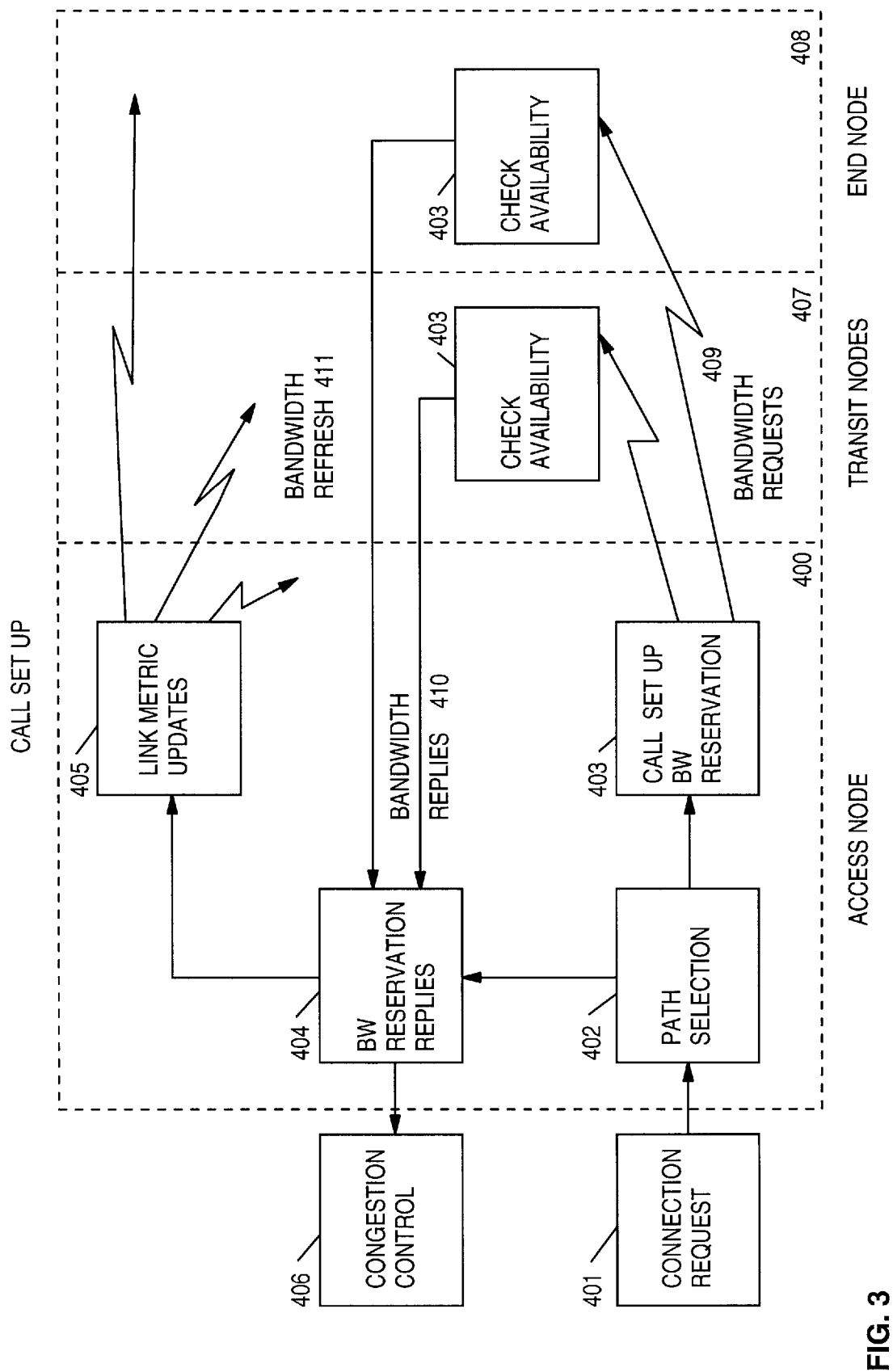
FIG. 3 is a schematic representation of call set-up operations.

At the connection set up (see FIG. 3), two paths, one for each direction, are computed and described by a source routing chain. Before sending data packets along said paths, transmission capacity must be reserved. The reservations for transmission from the origin to the destination are called the forward bandwidth reservations, and the reservations for transmission from the destination to the origin are called the backward bandwidth reservation. But as far as this invention is concerned, no discrimination needs being made between these two paths. In addition, an already established connection may require a bandwidth increase at a given moment.

In principle, the origin node (400) sends a Bandwidth Request message (409) to each of the transit nodes (407) along the chosen path, and to the destination node (408).

Upon receiving a Bandwidth Request message, a transit node determines (403) if there is sufficient capacity to satisfy the request. Each transit node responds to the origin node with a Bandwidth Reply message (410).

If a transit node cannot accommodate the request capacity in either direction, it sets its Bandwidth Reply to zero.

When the origin node collects a non-zero Bandwidth Reply for each link along the intended route and from the destination node, the reservation is deemed successful. It then immediately sends a Bandwidth Refresh message (411) to each transit node (407) and to the destination node (408) to let them know that all parties have agreed to the reservation. It also sends a Path Enabled message to the destination node indicating that all parties have agreed to the backward reservation. The destination node responds by sending a Bandwidth Refresh message to each transit node and to the origin node along the reverse path. If the origin node receives a zero Bandwidth Reply from any transit node or from the destination node, the reservation fails.

Basically, as already mentioned, bandwidth assignment as well as bandwidth adaptation are based on connection priorities. Connection priorities are used by the Path Selection process to determine the feasibility of a potential route for a network connection.

A straightforward method for assigning bandwidth relies simply on relative connection priorities. A new connection as well as a connection requiring a bandwidth increase is served on a priority basis, with the requesting connection possibly "preempting" bandwidth from already established lower priority connections. To avoid the hassle of such a solution, which might possibly require disrupting (i.e. breaking) an already established connection and looking for rerouting the corresponding path and thus possibly resulting in a network collapse, the present invention takes a different approach.

To that end, the bandwidth for any network connection is split into two parts or portions, i.e. a "nominal" bandwidth and a "common" bandwidth. The nominal bandwidth is assigned the priority (holding priority) of the connection. The common bandwidth is the bandwidth reserved by the connection in excess of its nominal bandwidth when a bandwidth increase is performed to satisfy a temporary need for additional bandwidth. The common bandwidth is assigned priorities which, while being individually related to each nominal bandwidths priorities are nevertheless lower than any nominal bandwidth priority. For example, if network connections can have nominal priority values between zero and p, the common bandwidth priority, q', of a connection having a nominal priority q, may then be $q'=q-p-1$. But naturally different relationships between nominal priorities and associated common bandwidth priorities might be used as long as: first whatever be the nominal priority, the common priorities shall always be lower than any nominal priority; second, the lower the nominal priority, the lower the corresponding common priority.

Then any new connection setting or bandwidth increase in an already set connection becomes possible by preempting on connection common bandwidth while leaving all connections nominal bandwidths untouched (or at least affected only down to a predefined minimum) thus allowing avoiding any disruptive effect of an already established connection. With this approach, it is also possible to control or adjust bandwidth adaptation from within the network (within any network node) and thus adjust the traffic on fairer basis. The method is also made further adjustable by defining minimal values for the nominal bandwidths and allowing, in case of any nominal bandwidth required being superior to the total common bandwidth, preempting on nominal bandwidths of lower priorities, but only down to the defined minimals.

Bearing in mind that each priority level shall, in practice, be assigned to a great number of connections (e.g. one hundred connections), the chances for seriously disturbing the network by reassigning some nominal bandwidth are quite low.

In operation, the bandwidth handling is two-fold with nominal values being defined by the customer and used at connection establishment (i.e. set-up), and dynamic variations based on the actual data traffic and its impact on the connection bandwidth. Such an arrangement makes it possible to adjust the bandwidths assigned to the network connections not only in the network ports but also in any network node along the connections paths and thus matching more precisely to current network operation with minimal delay.

Figure 4:
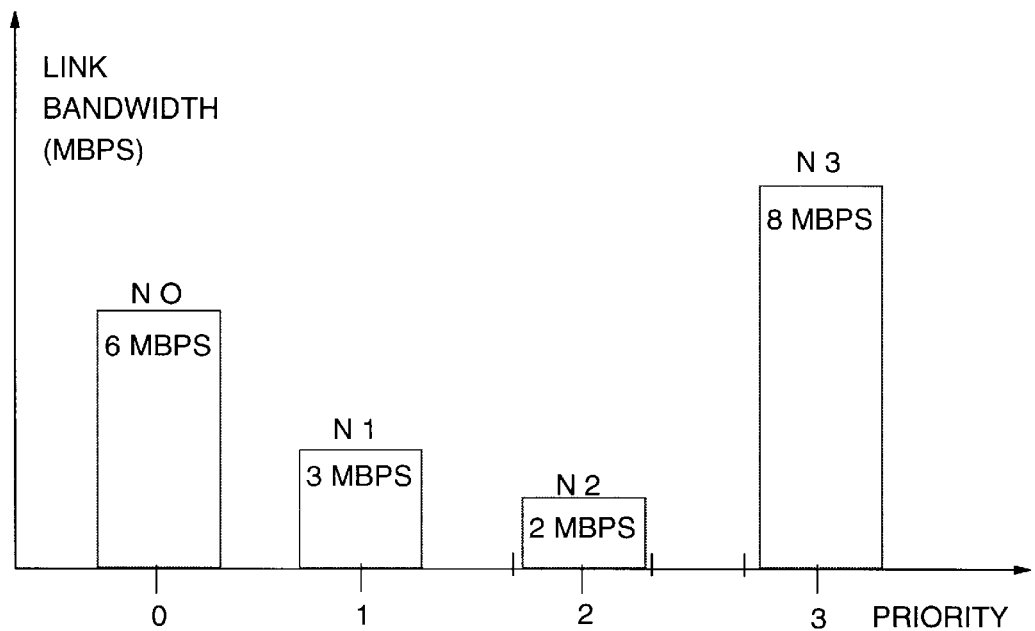
FIG. 4 is a schematic representation of an example of bandwidth distributions to connections of different so-called nominal priorities, on a given network link.

A great number of connection priorities, say 64 for example, have been subdivided, into four priority levels. FIG. 4 shows an example of network link (E3) in which the priorities have been combined into four available priorities labeled priority zero, 1,2 and 3. In the considered example, on the 34 Mbps of the E3 link, 85% have been made reservable (i.e. assignable) as nominal bandwidth, with No=6 Mbps actually reserved to connections of priority zero, N1=3 Mbps reserved to connections of priority 1, N2=2 Mbps reserved to connections of priority 2 and N3=8 Mbps reserved to connections of priority 3. Accordingly, 10 Mbps of the E3 link reservable bandwidth are still available and shall be made assignable to the so-called common shared bandwidth herein also designated as common bandwidth. Said common bandwidth is assigned lower priorities than those of the nominal bandwidth.

Figure 5:
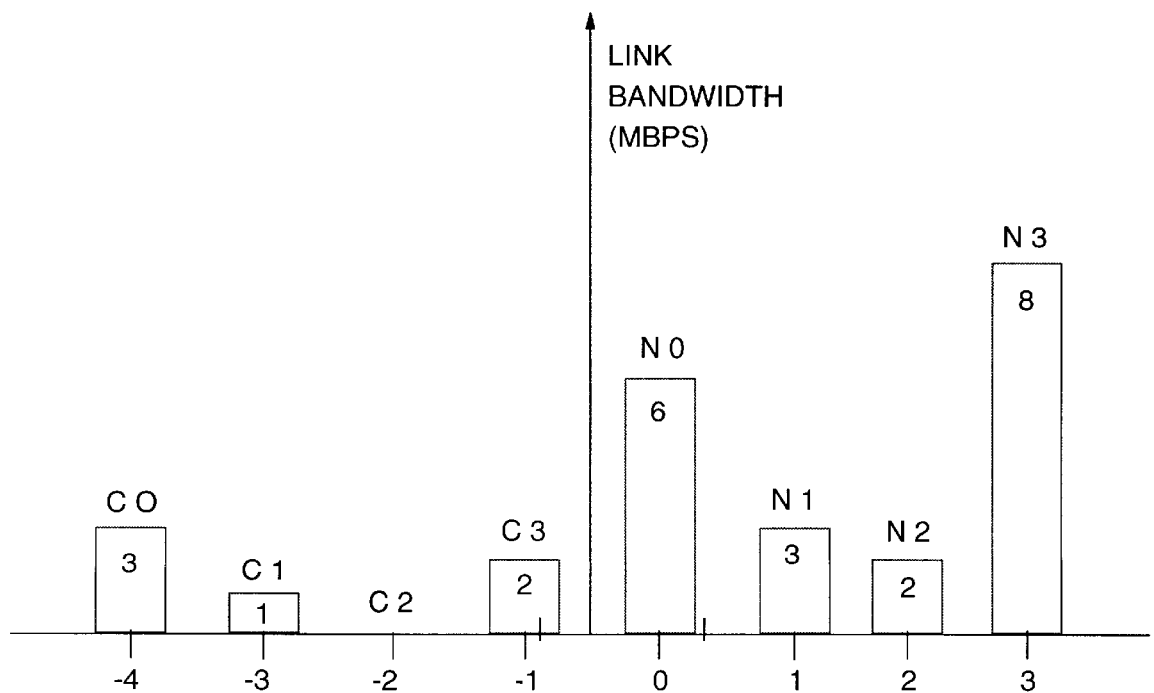
FIG. 5 is a schematic representation of the bandwidth distributions of FIG. 4 wherein so-called common bandwidth priorities have been defined with predefined relationships to connection priorities of so-called nominal bandwidths.

FIG. 5 shows the same example as FIG. 4, but wherein Co=3 Mbps with priority −4 (the lowest) are for common bandwidth assigned to connections of nominal priority zero, $C_1$=1 Mbps with priority −3 are assigned to connections of nominal priority 1, $C_3$=2 Mbps with priority −1 are assigned to connections of nominal priority 3, while no common bandwidth has been assigned to connections of nominal priority 2 which otherwise should be assigned to common priority −2. Four Mbps of link reservable bandwidth are free.

In operation, each node Topology Database stores Tables indicating the total bandwidth assigned currently in each network node for each connection priority for both common bandwidth and nominal bandwidth. In other words, the Topology Database stores the sum of common bandwidth reserved by each connection priority level assigned to common bandwidth and the sum of nominal bandwidth reserved by each connection priority level assigned to nominal bandwidth. The Topology Databases may also be made to store other useful parameters such as total bandwidth reserved currently (TOT_BW).

With the information stored in these Topology Databases the system may, for instance, determine very simply whether a new connection request may be directly satisfied or rejected; or a routine be entered for preempting some common bandwidth or even some nominal bandwidth above assigned minimal (to avoid disrupting any already established connection).

To that end, each network node stores specific parameters describing said node situation regarding bandwidth assignment as shall be indicated hereunder (see Tables and Variables) with regards to the best mode of implementation of the invention.

The algorithms and flowcharts involved in the preferred embodiment of the invention will now be described in detail.

Following is a description of the Tables and Variables used in the algorithms and stored in the Topology Databases and otherwise in the specific nodes as mentioned above.

```
*************************************************************
*****
        Tables and Variables used in the Flowcharts Data in Topology database in each node
TAB_C(i)        i = 1, . . . , M:   Sum of common bandwidth reserved
                                    for connections of priority i
-------------------------------------------------------------
- - -
- - - - - -
TAB_C(i + M)    i = 1, . . . , M:   Sum of nominal bandwidth
                                    reserved for connections of priority i
-------------------------------------------------------------
- - -
- -
TOT_BW = Total bandwidth reserved currently on trunk Data stored in the node that owns the TCM (trunk connection manager)
N_con = Max number of connections currently supported by the adapter
-------------------------------------------------------------
- - -
- -
id_tab(i)   i = 1, . . . , N_con    inverse connection table
                                    id_tab(connection id) gives index
                                    of connection in CONN_TAB
                                    Can be implemented by CAM
-------------------------------------------------------------
- - -
- -
Connection table
CONN_TAB(j;p)   j = 1, . . . , N_con
                p = 1, . . . , 5
                Each entry in the table includes:
                p = 1 C_ex: current bw in common pool
                p = 2 C_nom: current bw in nominal pool
                p = 3 C_min: min bw
                p = 4 address of connection originator
                p = 5 connection identifier
-------------------------------------------------------------
- - -
- -
Index table
ITAB(i,j)       i = 1, . . . , 2M
                j = 1, . . . , J
                (dimension J is variable thanks to chaining techniques)
o ITAB(i,j) = index of each of the J connections currently using band-
width
with priority i
        - Common bandwidth is accounted in i = 1, . . . , M
        - Nominal bandwidth is accounted in i = (1 + M), . . . , 2M
o The entries in this table are indexes used to address CONN_TAB
o Note that for better efficiency, for each priority i the indexes
could be ranked from smallest to largest bandwidth,
i.e connection with index ITAB(i,1) uses more bandwidth
than connection with index ITAB(i,2)
-------------------------------------------------------------
- - -
- -
NTAB(i)    i = 1, . . . , M:        Number of connections with priority i
                                    using common bandwidth
                                    (which can be 0)
NTAB(i)    i = 1 + M, . . . , 2M:   Number of connections with priority i
                                    using nominal bandwidth
                                    (can be 0)
-------------------------------------------------------------
- - -
- -
Free_index_list  list of available indexes (dimension is N_con)
*************************************************************
```

In the following description we shall deal with defined nominals with already subtracted defined minimal values. In other words only preemptable bandwidth shall be dealt with, the non-preemptable bandwidth being left apart to ensure non disruptive connection operations of the network.

In addition, while in the above description of the invention principles, the common bandwidth had been assigned negative priorities to explain their full preemptive status whatever be the number of nominal priorities, and also define their relationships versus nominal priorities (see FIGS. 4 and 5 with corresponding description), the algorithms and flowcharts for implementing the invention, shall, for sake of simplifying the operations, deal with positive priority levels only. One may assume that the link bandwidth reference ("Y" reference axis) of FIG. 5 has been shifted to the left. In other words, the common bandwidths priorities have been labeled i=1,2,3, . . . ,M, while the (nominal minus minimum) bandwidths priorities are labeled i=M+1, M+2, . . . , 2M; M being a predefined number of priorities assignable to the network connections.

In operation, at any new connection request, the system must start with selecting a transmission path, through the network, between the requesting user at originating port and the end user attached to a destination port of the network. Many path selection mechanisms are known in the art of fast digital network. One of theses mechanisms uses the so-called Bellman-Ford algorithm. Basically, all network links are scanned between originating port, and end-user's port and all links parameters of potentially acceptable links (e.g. bandwidth occupancy, link capacity, etc . . . ) down to the user are stored. Then the path best matching the originating user's demand and fitting best to current network topology is defined (i.e. the path is selected). Subsequently, as already mentioned, a call set-up message is forwarded along the selected path to each node Transit Connection Manager which manages the bandwidth on each attached trunk. The same rationale applies for the return path and therefore there is no need for duplicating the present description.

Figure 6:
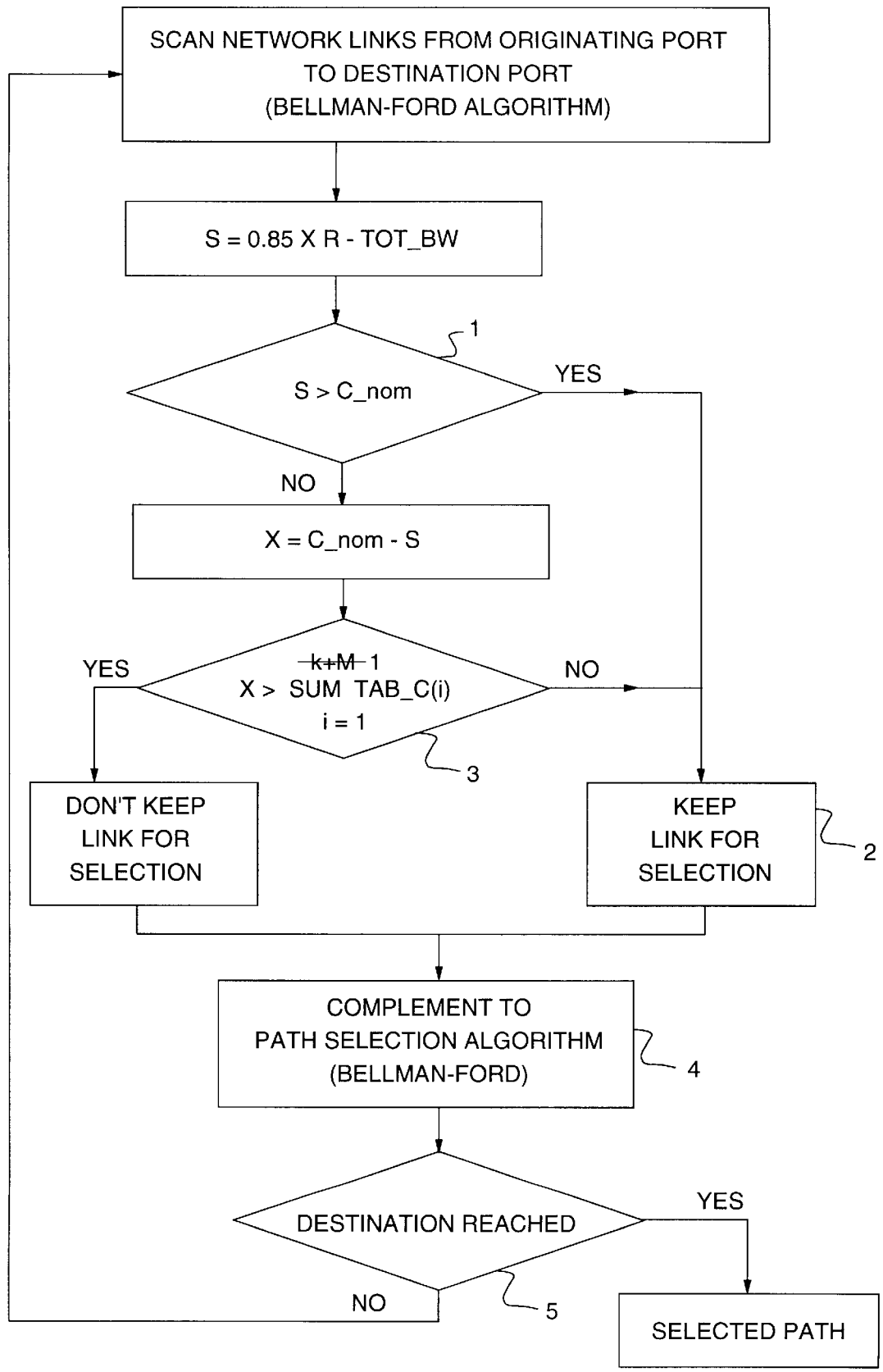
FIGS. 6 through 11 are flow charts for implementing the method of this invention.

Now, since basic conditions have been set for bandwidth assignment according to the present invention, the path selection algorithm shall include predefined tests for a new connection request with the following parameters:

nominal bandwidth requested: C_nom minimum nominal bandwidth requested: C_min connection priority: k address of requestor origin: origin_ADDR connection identifier: conn_id Given those parameters, for satisfying the new connection request, the system starts a path selection process with checking whether the requested nominal bandwidth is fully available (step 1 on the flowchart of FIG. 6). In other words, the system checks whether the requested nominal bandwidth is still less than the remaining available bandwidth S which is equal to the predefined reservable amount (85%) of the link capacity R minus the total bandwidth reserved currently on the considered trunk. If the answer is positive, then the link is kept for selection (i.e. reference stored (step 2)). But should the answer of step 1 be negative, a second test (step 3) is performed to check whether the amount of bandwidth X required to satisfy the request is potentially preemptable on already assigned bandwidth but in a non-disruptive manner. This test is made by testing whether the X bandwidth is higher than the total bandwidth currently preemptable. Should the answer be positive, the link is discarded from selected links, otherwise the link is kept as potentially selected link. Once the above operations are performed, the remaining path selection Bellman-Ford algorithm steps are executed (step 4) until the destination port is processed (step 5) in which case the path is fully selected. Once the path is selected, a call acceptance algorithm (see flowchart of FIG. 7) is executed by the Transit Connection Manager of each network node along the selected path.

Figure 7:
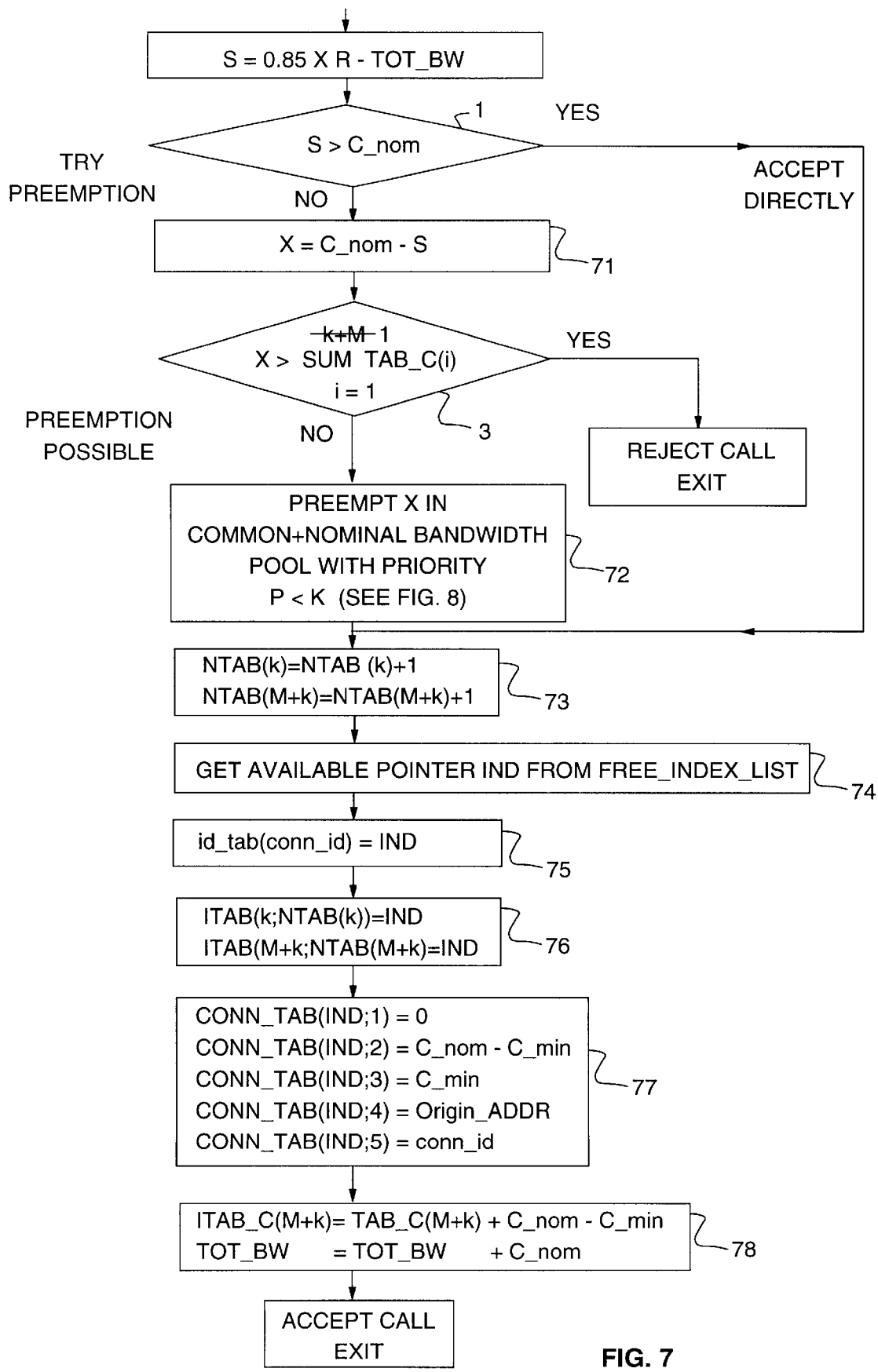

Let's now consider FIG. 7. Given the above defined parameters, the system starts again with checking whether the requested nominal bandwidth is fully available (step b 1 on the flowchart of FIG. 7). In other words, the system first computes the remaining available bandwidth S by subtracting the total bandwidth TOT_BW currently reserved from the predefined amount (85%) of the link reservable capacity and checks whether the requested nominal bandwidth C_nom is still less than the remaining available bandwidth S, or has varied in the meantime. If the answer is positive, then the request may be directly accepted without any preemption algorithm execution being required. The node connection tables and other Topology Databases need only be updated as shall be explained in the following description.

Now, should the answer to the test of step 1 be negative, a second test is performed to check whether a preemption operation is possible or not. The amount of bandwidth X required to satisfy the new request is computed in 71, and tested to determine whether it is higher than the total preemptable bandwidth, i.e. the sum of common bandwidths and available (i.e. other than non preemptable minimals) nominal bandwidths reserved for all priorities lower than "k".

Should the X be higher than total preemptable bandwidth, the request cannot be satisfied and the call is rejected. Otherwise, a variable X is set to C_nom (71), and the preemption mechanism may start. Said preemption mechanism (labeled 72 in FIG. 7) is fully represented in FIG. 8.

Figure 8:
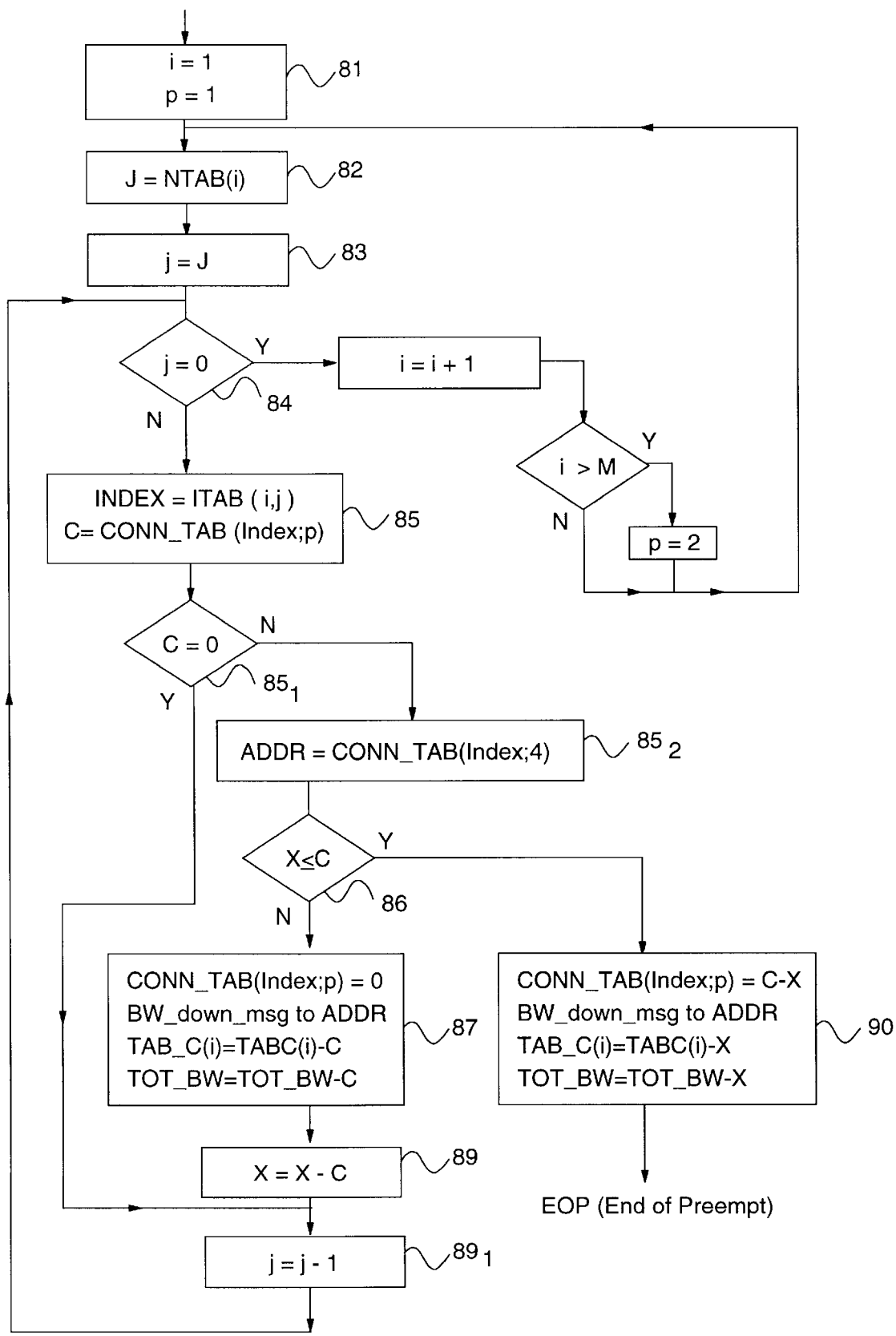

According to FIG. 8, the flowchart for preempting the bandwidth X starts with setting i=1 and p=1 (see 81). Then, an index J is set to the number of connections with priority i. One should note that, in the preferred embodiment of this invention, for each priority i, the indexes have been selected to classify the connections in increasing preemptable bandwidth occupation order. Accordingly, the algorithm is simplified while enabling modifying a minimum number of established connections to satisfy the considered connection request. Accordingly, in the preempting algorithm j is initialized to its maximum value, i.e. j=J (see 83). The value of j is then tested versus zero. If j=0, i is incremented by one unit and then tested versus M. If i>M, meaning that all common bandwidth have been considered for preemption, then the system switches to the nominal bandwidths up to priority k−1 (as indicated in (72) on the flowchart of FIG. 7) by setting p=2. Then, once p=2 or assuming i<M, then the system switches back to (82).

Now, if the test (84) indicated that j is different from zero, the routine goes to (85). An Index is set to the value of the j connections currently using bandwidth with priority i. Said index is used to address the CONN_TAB providing the indication of current bandwidth available in the pool, that is either common bandwidth for p=1, or nominal bandwidth for p=2.

A new test is performed (85$_1$) to check whether the current bandwidth available for preemption is null. Should the answer to this test be positive, a new connection is tested by decreasing the index j, else, the address of the connection originator is looked (85$_2$) to further send a message to the originator.

A new test is then performed (86) to check whether the requested bandwidth X is smaller than the available preemptable bandwidth considered. Should the answer to this test be negative, the preemptable bandwidth is preempted anyway, and the connection table is updated accordingly (step 87). In other words, the pool is updated by clearing the corresponding connection bandwidth content. The preempted connection address is made aware of the modification, unless the previous table content was already null. This is performed through a bandwidth down message to the preempted connection address.

The parameters X and j are then updated by subtracting C from the requested bandwidth (89) and decrementing j by one unit (89$_1$), and the preemption algorithm loops back to (84) until full satisfaction of the new connection request. But, if the test 86 indicates that the available preemptable bandwidth is sufficient to meet the request, preemption is operated, the connection table is also updated and the preempted connection is sent a message to make it aware of the modification of its preemptable bandwidth (90). The process has reached End of Preemption (EOP) routine.

Let's now turn back to FIG. 7, the Tables and Variables are then updated. The reference number of connections of the considered requesting priority k is increased by one unit (see 73 bearing in mind that nominal priorities start at i=M+1).

In the preferred embodiment of this invention, the connection identifiers may be quite long (say 32 bytes long) so that each connection of the network is uniquely identified. Consequently, the number of possible combinations is very high (e.g. $2^{256}$ possibilities), which is much larger than the effective number of connections. A conversion is thus performed through a Content Addressable Memory (CAM). Said CAM, once addressed by the Connection identifier (conn_id) provides a table position index which is used as connection reference, or pointer. Now, in operation, once a CAM position is cleared to indicate cleared connection, the corresponding pointer is filled into a free index list operating in FIFO manner and providing the available pointer (IND). Then, once operation 73 is performed, the system gets an available pointer IND from the free index list (see 74). Then the id_tab (conn_id) is set to value IND (see 75). The index of the connections currently using bandwidth of priority k and M+k are set to IND (see 76) affected by the new connection, within the connection table.

The current bandwidth in common pool is set to zero; the bandwidth affected to preemptable nominal bandwidth is set to C_nom−C_min; the minimum bandwidth is set to C_min, and the connection address and identification are stored. Finally, the total bandwidth indicators are updated (78) both for total bandwidth reserved currently and for minimum reserved bandwidth, with the parameters of the new connection, while the sum of nominal bandwidth for the considered k priority is updated also. The system may then exit the considered routine, the call being fully accepted.

Figure 9:
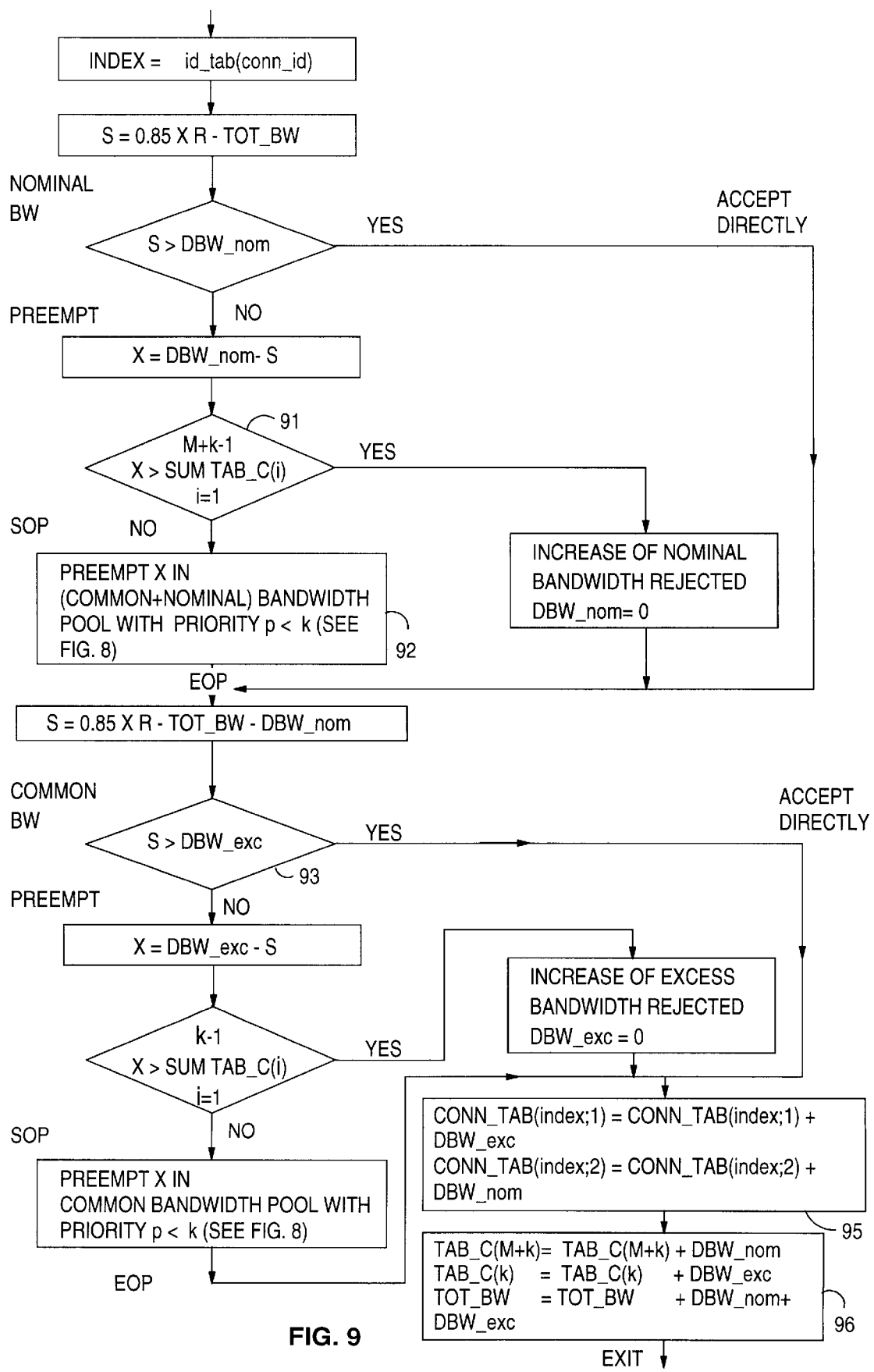

Represented in FIG. 9 is a flowchart for implementing the algorithm for satisfying a request for bandwidth increase of a connection identified by its "id", and its priority "k" for a nominal bandwidth variation DBW_nom and a common bandwidth variation DBW_exc.

The algorithm starts with defining the index of the connection from the id_tab(conn_id). Then the system checks whether the increase in nominal bandwidth could be satisfied directly; i.e. DBW_nom remains lower than the remaining available bandwidth S. If this is the case, then the request is accepted directly and the system looks for common bandwidth variation. Otherwise, a preempting routine is started. To that end, the amount of bandwidth X required to satisfy the request is computed and compared to the total reserved bandwidth for connections of priorities one through M+k−1 (see 91). If the requested bandwidth X is smaller than the preemptable bandwidth, then the mechanism for preempting X in the (common+nominal) bandwidth pool of priority p lower than k is started (see 92). This mechanism has already been described with reference to FIG. 8. But, in case X is smaller than the preemptable bandwidth, the increase of nominal bandwidth is rejected and DBW_nom is set to zero.

The system processes then the request for increase in common bandwidth DBW_exc. The basic principles are similar to those considered when processing the request for increase in nominal bandwidth. The system starts with checking whether the request for increase in common bandwidth DBW_exc could be satisfied, i.e. if DBW_exc is lower than the remaining available bandwidth S (see 93). If this is the case, the request is accepted directly and the routine goes to Tables and Variables updating. Otherwise a preempting routine is started which is similar to the above mentioned routine referring to the first part of the flowchart of FIG. 9, except that the requested bandwidth X is now compared to total reserved bandwidth for connections with priorities from 1 to k−1 (see 94) and then the rest of the routine is similar to above (see call preemption routine of FIG. 8).

Finally, once the bandwidths have been preempted for satisfying the requested bandwidths increases, the tables are updated (see 95). To that end, the CONN_TAB (index; 1) is increased with the assigned increment in common bandwidth (i.e.:DBW_exc) and the CONN_TAB (index; 2) is increased with the assigned increment in nominal bandwidth (i.e.:DBW_nom). Also, (see 96) the sum of nominal bandwidths reserved for connections of priority (M+k) is incremented by DBW_nom and the total bandwidth currently reserved is incremented by the predefined increases in both nominal bandwidth (DBW_nom) and common bandwidth (DBW_exc) and the routine exits.

Figure 10:
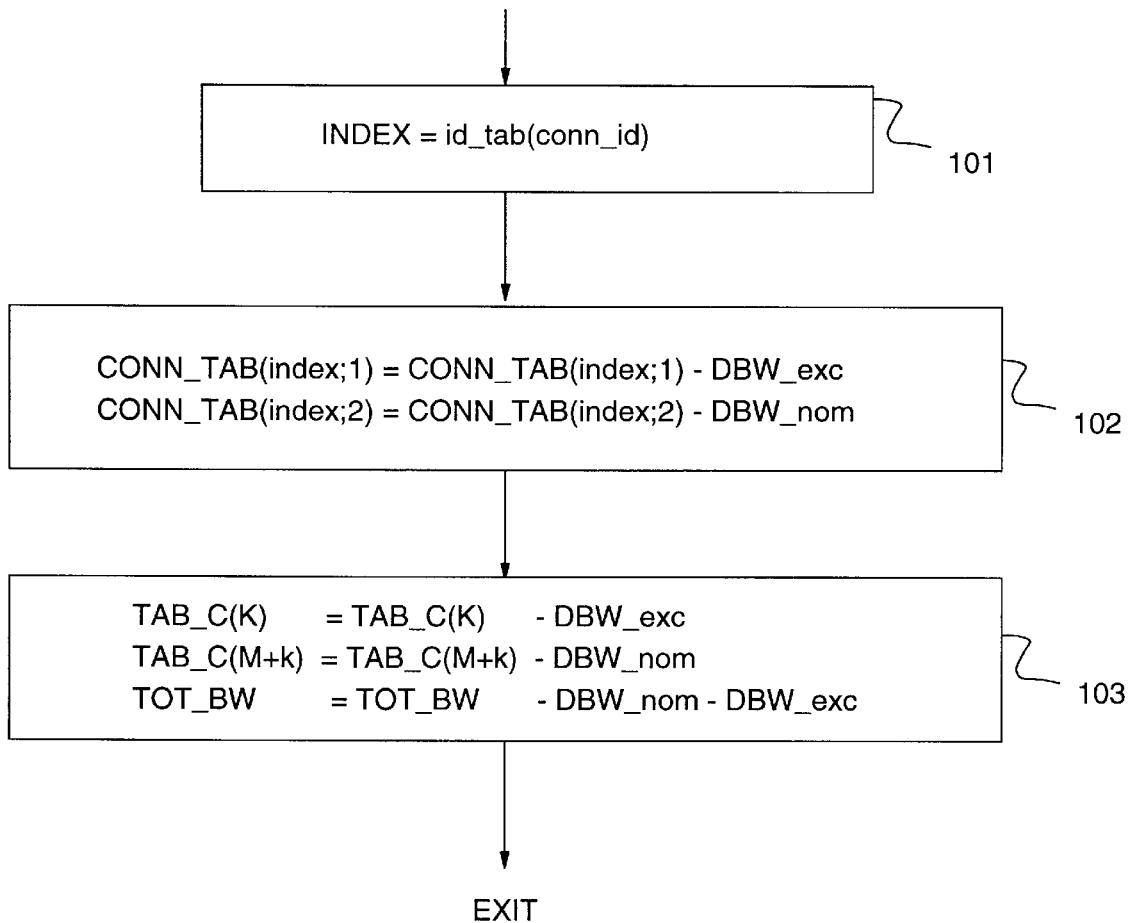

The flowchart of FIG. 10 is made to implement an algorithm for decreasing the bandwidth of an operating connection. The connection is defined by its conn_id and priority k. The amount of nominal and common bandwidths variations to be operated are defined by DBW_nom and DBW_exc respectively. The algorithm starts (101) with setting the index of the connection CONN_TAB to id_tab (conn_id) and then uses this index to update the connection tables in the nodes by subtracting DBW_nom and DBW_exc from the current bandwidths in nominal pool and common pool respectively (102). In the same manner, the sum of common bandwidth and sum of nominal bandwidth for connections of priority k are updated as is the total bandwidth reserved currently on the link (see 103).

Finally, the bandwidth management performed according to this invention shall include a so called Take Down algorithm for preempted connections. Let's assume the corresponding taken down connection be again defined by its connection identifier (conn_id), priority (k) and nominal bandwidth (C_nom), common bandwidth (C_exc), and minimum bandwidth C_min.

Figure 11:
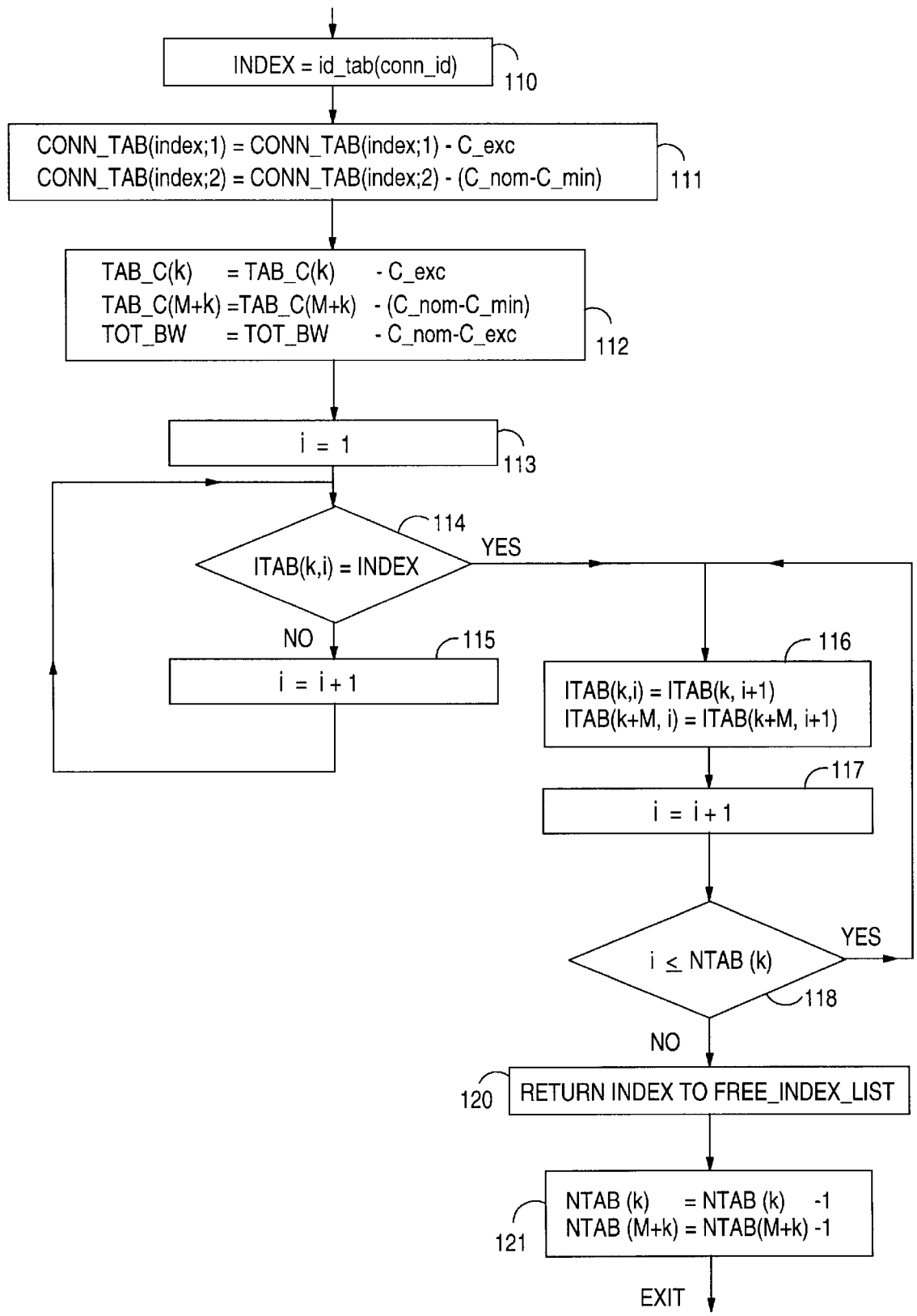

As represented in the flowchart of FIG. 11, the process starts again with setting an index of the connection table to the value of id_tab(conn_id) (see 110). Then the connection tables are updated accordingly by subtracting C_exc and C_nom from the current value stored in the connection table positions pointed at by (index;1) and by (index;2) respectively (see 111). The sums in common bandwidths and nominal bandwidths for priority k, as well as total bandwidth are then updated in TAB_C(k), TAB_C(M+k) and TOT_BW. The entries in the inverse table corresponding to the connection being taken down, are updated. An index i is set to one (see 113) and all the entries of priority k in the inverse table ITAB are scanned until the entry corresponding to the connection index is found (see 114 and 115). Then all entries of higher rank are shifted down by one unit (see 116, 117 and 118). It should however be noted that this particular implementation can be simplified by chained pointer techniques for example. The considered index of the cleared free index list position is returned into the FIFO buffer storing the Free index list (120) and the number of connections with priority k and (M+k) are then also updated accordingly (121).

We claim:

1. A method for assigning link bandwidth to a requesting user in a high speed digital network which interconnects network users through paths including high speed links which interconnect network nodes, said method comprising:

establishing pre-defined connection priorities among said users;

splitting predefined reservable link bandwidth into a nominal bandwidth portion and common bandwidth portion, both of which are assignable to the same connections on a priority basis;

each of common bandwidth priorities being individually related to a nominal bandwidth priority through a predefined relationship making said common bandwidth priorities lower than any nominal priority, whereby requested link connection bandwidth, whatever be its nominal priority, is preemptable primarily on said common bandwidth portion, thus avoiding the disruption of any already established network connection.

2. A method according to claim 1 wherein said requested link bandwidth, in addition to being preemptable on said common bandwidth priorities is also preemptable, subject to predefined minimal values, on nominal bandwidths bearing a lower nominal priority than the requesting nominal bandwidth priority.

3. A method according to either claim 1 or 2 wherein the common bandwidth priority of a connection having a nominal priority q, with $0<q\leq p$, p being the highest predefined nominal priority, is $q'=q-p-1$.

4. A method according to claim 1 for assigning link connection bandwidth to a connection request with nominal priority k, requesting a nominal bandwidth, C_nom, said method including:

(A) checking whether the sum of C_nom and the already occupied link bandwidth is lower than the predefined total reservable bandwidth on the link, (B) if the result in step (A) is positive, accepting said request;

(C) if the result in step (A) is negative, checking whether C_nom is higher than the total preemptable bandwidth including the common bandwidth and preemptable nominal bandwidth;

(D) if the result in step (C) is positive, rejecting the request;

(E) if the result in step (C) is negative, preempting C_nom bandwidth on said preemptable bandwidth starting from the lowest common bandwidth priority up to the nominal priority k−1.

5. A method according to claim 4 wherein said total reservable bandwidth on the link is fixed to a predefined percentage of the link bandwidth.

6. A method according to claim 4 wherein the total preemptable bandwidth includes the total common bandwidth and the nominal bandwidth in excess of said predefined minima up to priority k−1.

7. A method according to claim 6 wherein the requested nominal bandwidth values to be originally assigned are defined by the network users at connection set-up; making dynamic bandwidth adaptations based on actual traffic for bursty traffic connections by preempting on common bandwidth; and then, if necessary, preempting on nominal bandwidth down to the predefined minimum.

8. A system for establishing a connection, on predefined priority basis, by defining a path for connecting a requesting end user to a destination end user, through a high speed network including network nodes interconnected by communication links, said end users being attached to said network through network entry nodes providing ports, each node and port including means for storing a topology database for storing, in addition to the list of current network nodes and ports, a table storing properties of the links, including the bandwidth reserved on the link;

the link bandwidth being split into nominal bandwidth portions and common bandwidth portions, both of which are assignable to the same connections on a priority basis, with each of said common bandwidth priorities being individually related to a nominal bandwidth priority through a predefined relationship making said common bandwidth priorities always lower than any nominal priority, said system including:

means for scanning the links from the port attached to a requesting end user to said destination port, and for selecting as potential links for the path, only those scanned links for which the requested nominal bandwidth, C_nom, added to the total link bandwidth reserved currently as provided by the corresponding link table is lower than a predefined reservable amount of the link bandwidth; or for which C_nom is preemptable on already assigned link bandwidth without disrupting any currently established connection; and means sensitive to said scanning means for defining the connection path between said requesting end user and the destination end user by selecting among said potential links.

9. A system as in claim 8 further comprising:

means for updating each said potential link acceptance along said path including; in each node along said path:

means for rechecking if C_nom added to the total link bandwidth reserved currently in the corresponding node link table is lower than the predefined reservable amount of the link bandwidth;

means for rechecking if C_nom is preemptable on the already assigned link bandwidth without disrupting any currently established connection; and means for updating the topology databases accordingly.

* * * * *